(12) United States Patent
Abiko

(10) Patent No.: US 6,962,343 B2
(45) Date of Patent: Nov. 8, 2005

(54) SEAL RING

(75) Inventor: Tadashi Abiko, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 316 days.

(21) Appl. No.: 10/257,942

(22) PCT Filed: Apr. 27, 2001

(86) PCT No.: PCT/JP01/03729

§ 371 (c)(1),
(2), (4) Date: Oct. 22, 2002

(87) PCT Pub. No.: WO01/84024

PCT Pub. Date: Nov. 8, 2001

(65) Prior Publication Data
US 2003/0102633 A1 Jun. 5, 2003

(30) Foreign Application Priority Data

Apr. 28, 2000 (JP) .............................. 2000-130689

(51) Int. Cl.⁷ .............................. F02F 5/00; F16J 9/00

(52) U.S. Cl. ...................... 277/434; 277/459; 277/460; 277/496; 277/499

(58) Field of Search ................................ 277/434, 459, 277/460, 496, 497, 498, 499, 500, 510

(56) References Cited

U.S. PATENT DOCUMENTS 5,344,162 A * 9/1994 Kernon et al. ............... 277/433
5,660,398 A 8/1997 Terao et al. .................. 277/216

FOREIGN PATENT DOCUMENTS

| EP | 0550312 | 9/1993 |
| JP | 8-28709 | 2/1996 |
| JP | 8-135797 | 5/1996 |
| JP | 8-159291 | 6/1996 |

* cited by examiner

Primary Examiner—Enoch E Peavey
(74) Attorney, Agent, or Firm—Jacobson Holman PLLC

(57) ABSTRACT

A seal ring is provided, which is capable of maintaining a stable sealing performance for a long period, in which a cut portion is provided at one position in a circumferential direction of a seal ring, a convex portion is provided at a first cut end portion, a recess portion is provided at a second cut end portion, and the end portions of a third surface and a sixteenth surface extending in the circumferential direction among the convex portion and recess portion correspond to a portion of a second seal portion for sealing a side wall surface of an annular groove.

4 Claims, 7 Drawing Sheets (a)

PRIOR ART (b)

SEAL RING

This is a nationalization of PCT/JP01/03729, filed Apr. 27, 2001 and published in Japanese.

TECHNICAL FIELD

This invention relates to a seal ring for sealing an annular gap between two members provided relatively rotatable to each other.

BACKGROUND ART

Conventionally, the seal ring of this type is used in, for example, a hydraulic apparatus such as an automatic transmission for an automotive vehicle or the like.

A conventional seal ring will now be described below with reference to FIGS. 6 to 9. FIG. 6 is a schematic plan view of the conventional seal ring and FIG. 7 is a schematic cross-sectional view showing a state where the conventional seal ring is mounted.

Also, FIG. 8 is a perspective view showing a state of a cut portion (special step cut) of the conventional seal ring.

The seal ring 100 shown in the figures is adapted to seal an annular gap between a housing 200 provided with an axial hole and a shaft 300 inserted into this axial hole, and is used through being mounted on an annular groove 301 formed in the shaft 300.

The seal ring 100 is made of a resin material and is provided with a second seal portion 101 for sealing a side wall surface of the annular groove 301 provided in the shaft 300 and a first seal portion 102 for sealing an inner circumferential surface provided in the housing 200.

Then, when a pressure is applied on in a direction indicated by an arrow P toward a non-sealed fluid side A from a sealed fluid side O, the seal ring 100 is depressed on the non-sealed fluid side A, and thus the second seal portion 101 depresses the side wall surface of the annular groove 301, and, on the other hand, the first seal portion 102 depresses the inner circumferential surface of the axial hole provided in the housing 200 facing the annular groove 301, to thereby perform sealing in the respective positions.

In this manner, leakage of the sealed fluid to the non-sealed fluid side A is prevented.

Here, the sealed fluid means, for example, a lubricating oil, particularly such as an ATF in a case where it is used for an automatic transmission for an automotive vehicle.

Also, as shown in FIG. 6, a cut portion S0 is provided at one position in a circumferential direction in a ring body of the seal ring 100 for the purpose of enhancing assembling property or the like.

Various kinds of forms are known as such a cut portion S0. However, as a cut portion that may preferably cope with an issue of ambient temperature change, a special step cut having a shape cut into a two-step form as shown in FIG. 8 is known.

In this special step cut, since the sealed fluid side and the non-sealed fluid side are interrupted from each other while each vertical surface to the circumferential direction has a gap T in the circumferential direction, even if the ring body is expanded due to heat, an amount of change in dimension may be absorbed for such amounts that correspond to the gap T while keeping the sealed condition. Thus, it is possible to keep the sealing performance even against the ambient temperature change.

In the seal ring 100 described above, particularly in a case where the shaft 300 is made of a soft material such as an aluminum alloy, the second seal portion 101 and the side wall surface of the annular groove 301 are worn, respectively, due to the friction between both.

This is because a lubricating film of the lubricating oil is hardly formed between the second seal portion 101 and the side wall surface of the annular groove 301. In particular, in a case where foreign matters existing in the lubricating oil are entrained therebetween, the frictional wear is remarkable.

As a technical countermeasure for reducing such a frictional wear, there is known a technique to change the contact relationship between the second seal portion 101 and the side wall surface of the annular groove 301 from a conventional area contact to a linear contact to thereby facilitate the formation of the lubricating film so as to enhance wear resistance property.

FIG. 9 shows schematic views showing a seal ring in which the contact relationship is the linear contact. FIG. 9(a) is a schematic cross-sectional view, and FIG. 9(b) is a perspective view of an outline of a cut portion (special step cut).

Namely, as shown in FIG. 9, a seal ring 110 having a tapered cross-sectional shape is used, and a taper portion 111 of the seal ring 110 is brought into contact with a corner portion 302 that is formed by the side wall surface of the annular groove 301 and the outer circumferential surface of the shaft 300 so that the contact condition between the seal ring and the side wall surface is made linear, to thereby form the second seal portion to facilitate the formation of the lubricating film and enhance the wear resistance property.

However, there are cases where the above-described conventional technology generates the following problems.

In the above-described seal ring, as shown in FIG. 9(b), the corner portion 302 formed by the side wall surface of the annular groove 301 and the outer circumferential surface of the shaft 300 is brought into contact with the gap T of the taper portion 111 of the seal ring 110.

The gap T absorbs change in a circumferential length of the ring body in response to the ambient temperature change to keep the sealing performance, and its circumferential length is changed in accordance with the ambient temperature change.

Accordingly, in a case where the gap T becomes an oil leakage path indicated by an arrow in the drawing and, in particular, in a case where the circumferential length of the ring body is shortened due to the temperature change, the oil leakage is increased.

The present invention was made in view of solving the above-mentioned problem in the conventional technology, and an object of the invention is to provide a seal ring that is superior in quality for keeping stable sealing performance for a long period of time.

DISCLOSURE OF THE INVENTION

According to the present invention, a seal ring comprising, a first seal portion for sealing one of two members assembled coaxially to be rotatable relative to each other, and a second seal portion for sealing a side surface of an annular groove of the other member by coming into linear contact therewith, for sealing an annular gap between the above-described two members, is characterized in that:

a cut portion is provided at one position in a circumferential direction of a ring body, an arcuate convex portion projecting in the circumferential direction is provided at one cut end portion, a stepped portion fitted into the arcuate convex portion is provided at the other cut end portion; and a part of a cut surface, extending in the circumferential direction, out of the arcuate convex portion and the stepped portion corresponds to a part of the second seal portion.

In this manner, it becomes easy to form a lubricating film on a seal surface and it is possible to enhance wear resistance property and to reduce leakage of sealed fluid from the cut portion.

It is preferable that a cross-sectional shape of the ring body is polygonal, and the part of the cut portion corresponds to one of apex angles of the cross-sectional polygon in its cross section and the one apex angle of the cross-sectional polygon becomes an annular shape and comes into linear contact with a side surface of an annular groove of the other member to perform sealing as the second seal portion.

In this manner, it is possible to readily and positively reduce the sealed fluid leaked from the gap of the cut portion.

BRIEF DESCRIPTION OF THE DRAWINGS

FIG. 9(a) is a cross-sectional view and FIG. 9(b) is a perspective view.

BEST MODE FOR CARRYING OUT THE INVENTION

A seal ring according to an embodiment of the present invention will now be described with reference to FIGS. 1 to 3.

An overall structure and the like of the seal ring according to the embodiment of the present invention will first be described with reference to FIGS. 1 and 2.

Figure 1:
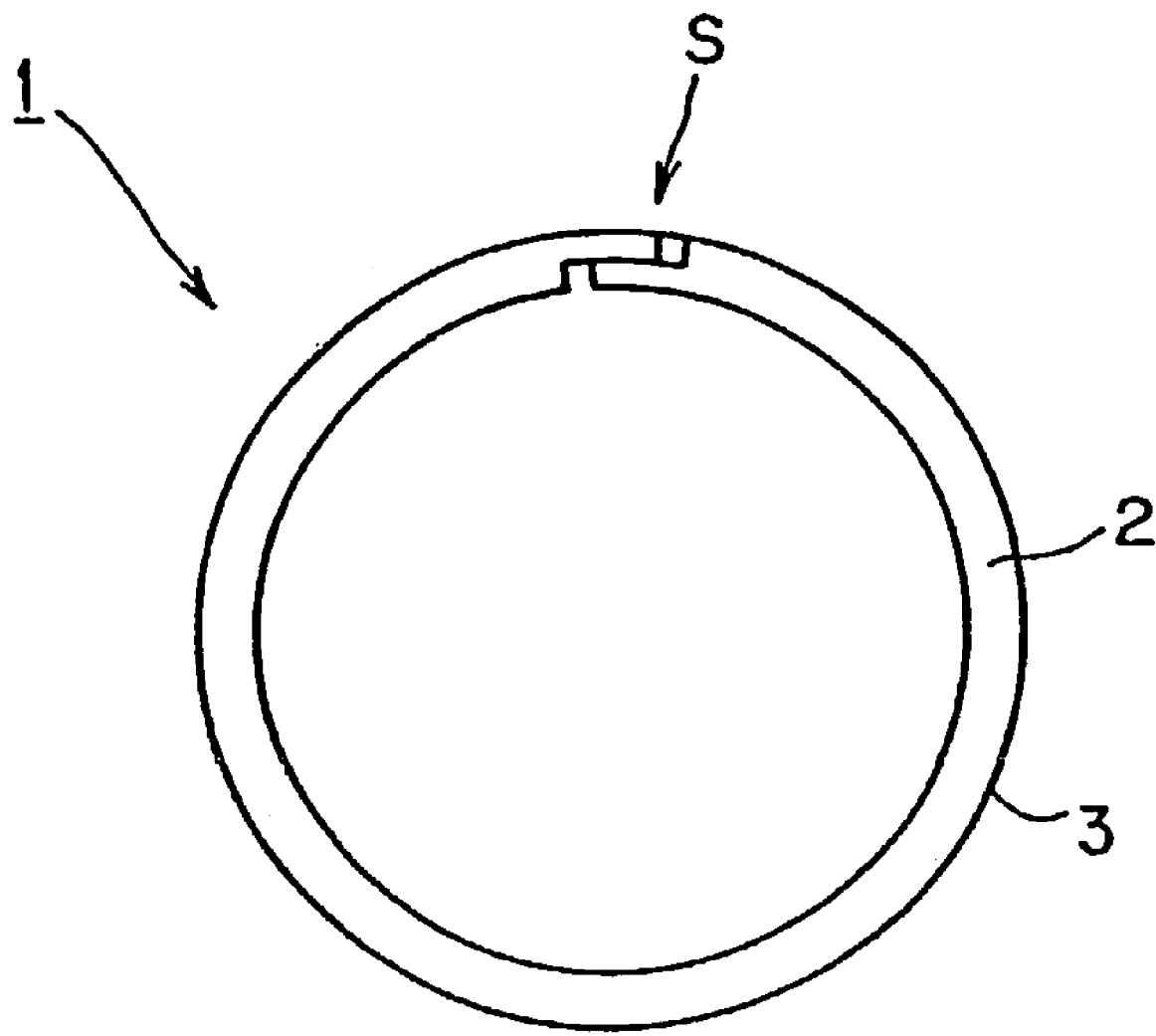
FIG. 1 is a schematic plan view of a seal ring according to an embodiment of the present invention.
Figure 2:
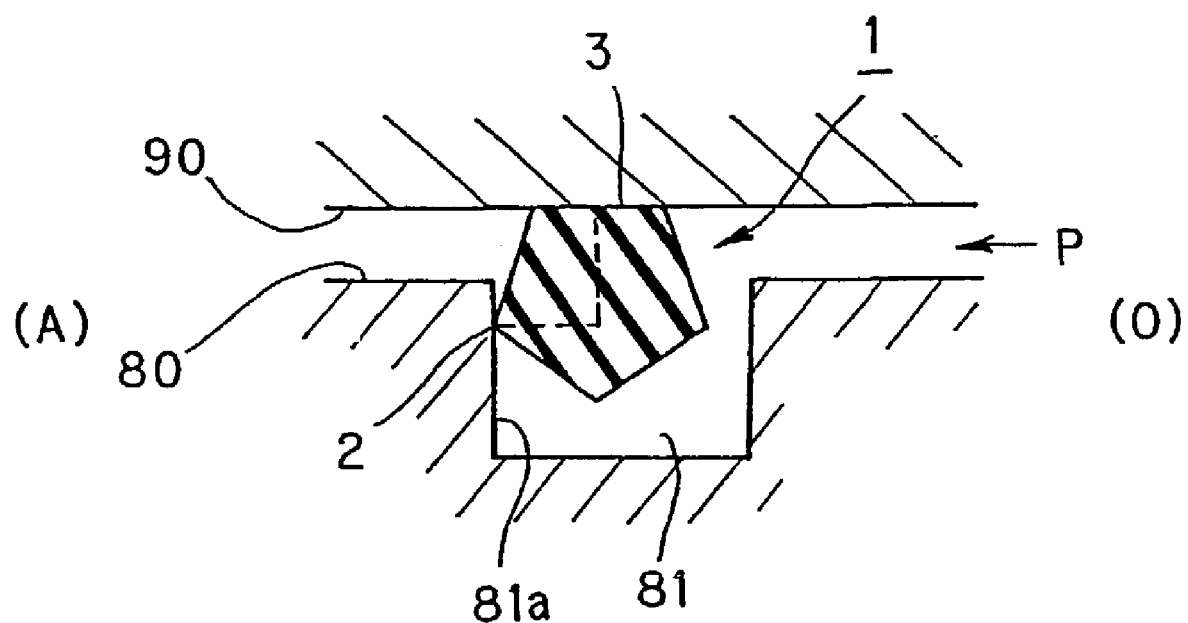
FIG. 2 is a schematic cross-sectional view showing a condition that the seal ring according to the embodiment of the present invention is mounted.
Figure 3:
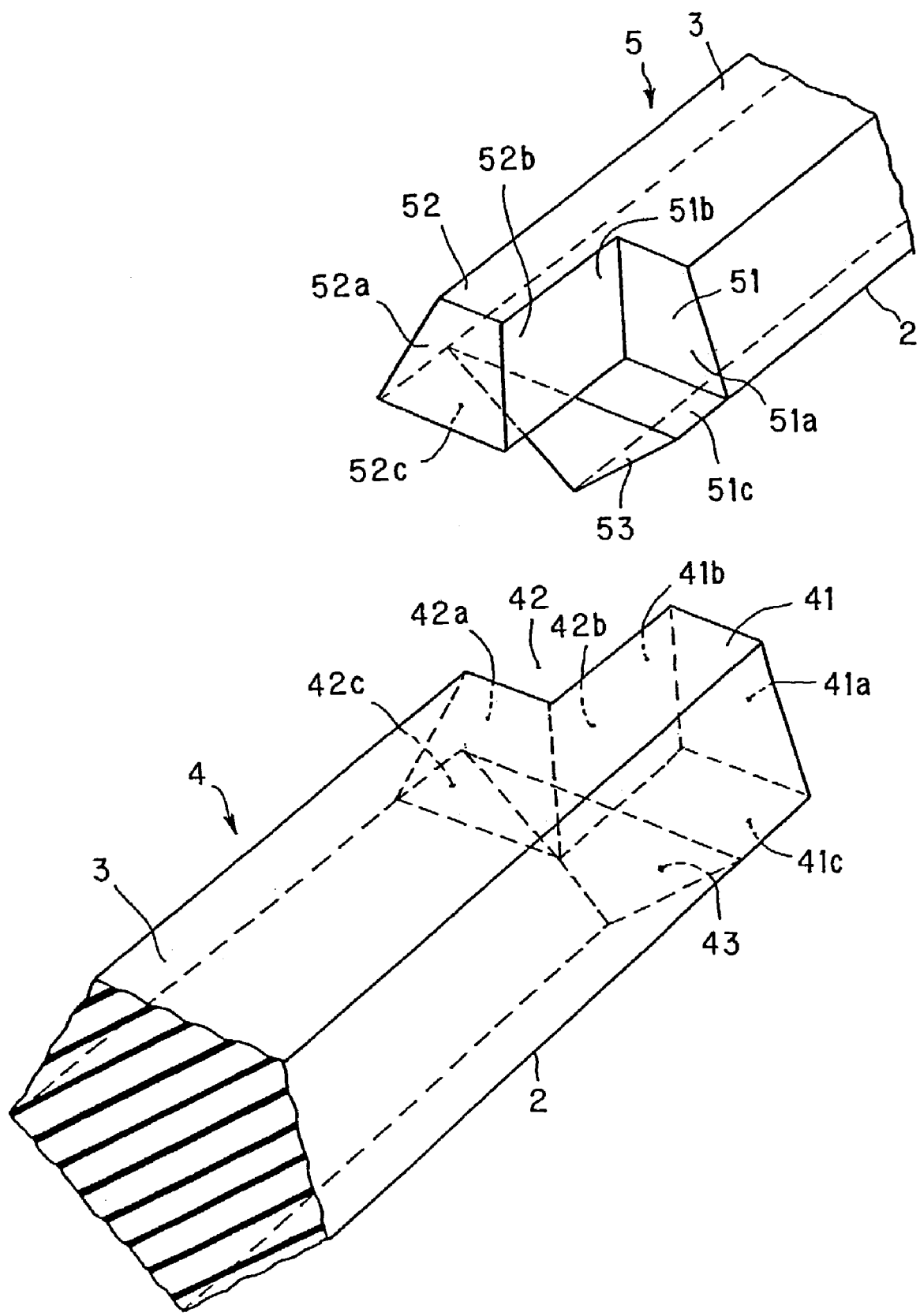
FIG. 3 is a schematic perspective view showing a cut portion of the seal ring according to the embodiment of the present invention.

FIG. 1 is a schematic plan view of the seal ring according to the embodiment of the present invention, and FIG. 2 is a schematic cross-sectional view showing a condition that the seal ring according to the embodiment of the present invention is mounted.

As shown in FIG. 2, a seal ring 1 according to this embodiment is adapted to seal an annular gap of two members assembled coaxially to be rotatable relative to each other, i.e., an annular gap between a housing 90 provided with an axial hole and a shaft 80 inserted into this axial hole, and used by being mounted in an annular groove 81 provided in the shaft 80.

The seal ring 1 is mainly provided with a second seal portion 2 for sealing a side wall surface 81a of an annular groove 81 provided in the shaft 80 as one member and a first seal portion 3 for sealing an inner circumferential surface 90a of the axial hole provided in the housing 90 as the other member.

A cross-sectional area of the seal ring 1 is smaller than a cross-sectional area of the annular groove 81, an axial length (width) thereof is smaller than an opening width between the inner side walls of the annular groove 81, an inner diameter thereof is greater than a diameter of a bottom wall of the annular groove 81, and an outer diameter thereof is slightly greater than a hole diameter of an inner hole of the housing 90. Then, as a structure that is characteristic of the present embodiment, the cross-sectional shape is a pentagonal shape, and one apex angle of the cross-sectional pentagonal shape in its cross-sectional shape is depressed against the side wall surface 81a of the annular groove 81, thus forming the second sealing portion 2.

With such a structure, when a pressure is applied on in a direction indicated by an arrow P in FIG. 2 from a sealed fluid side O to a non-sealed fluid side A, the seal ring 1 is depressed on the non-sealed fluid side A, and thus the second seal portion 2 depresses the side wall surface 81a (on the non-sealed fluid side A) of the annular groove 81, and, on the other hand, the first seal portion 3 depresses a portion, facing the annular groove 81, of the inner circumferential surface of the axial hole provided in the housing 90, to thereby perform sealing at the respective positions.

In this way, it is possible to prevent the leakage of the sealed fluid to the non-sealed fluid side A.

Incidentally, the sealed fluid in this embodiment means a fluid having lubricity. A lubricating oil will be explained as one example in the following description.

As shown in FIG. 1, a cut portion S is provided at one position in a circumferential direction for the purpose of enhancing assembling property or the like.

The form of this cut portion S is a special step cut structure that is cut into two steps so as to make it possible to preferably cope with the ambient temperature change.

The cut portion S will now be described below in detail with reference to FIG. 3. FIG. 3 is a schematic perspective view showing a state of the cut portion of the seal ring according to this embodiment, showing a condition that the cut portions are separated apart from each other for the sake of explanation. Incidentally, each cut end portion of the cut portions actually has curvature as shown also in FIG. 1 above but is schematically shown without any curvature in each drawing for the sake of explanation.

The cut portion S is divided into one cut end portion (hereinafter referred to as a first cut end portion 4) and the other cut end portion (hereinafter referred to as a second cut end portion 5) engaging with each other by cutting the ring body.

Then, a convex portion 41 as an arcuate convex portion and a recess portion 42 which are adjacent to each other are provided at the first cut end portion 4. On the other hand, a recess portion 51 as a stepped portion engaged with the above-described convex portion 41 and a convex portion 52 engaged with the above-described recess portion 42 are provided adjacent to each other in the second cut end portion 5, respectively.

Here, for the sake of explanation, the frontmost end surface out of wall surfaces (outer wall surfaces) defining the convex portion 41 will be referred to as a first surface 41a, an intimate contact surface in a normal direction of the first seal portion 3 and on the inner side will be referred to as a second surface 41b and an intimate contact surface coaxial with the first seal portion 3 and on the inner side will be referred to as third surface 41c.

Also, the surface vertical to the circumferential direction out of wall surfaces defining the recess portion 42 will be referred to as a fourth surface 42a, an intimate contact surface in the normal direction of the first seal portion 3 and on the inner side will be referred to as a fifth surface 42b and an intimate contact surface coaxial with the first seal portion 3 and on the inner side will be referred to as a sixth surface 42c.

Incidentally, the second surface 41b and the fifth surface 42b are located on the same plane. However, for the sake of explanation, these are given different names. Also, a surface that is a reference surface of the first cut end portion 4 will be referred to as a reference surface 43.

Also, in the same manner, on the second cut end portion 5 side, the frontmost end surface out of wall surfaces (outer wall surfaces) defining the convex portion 52 will be referred to as an eleventh surface 52a, an intimate contact surface in the normal direction of the first seal portion 3 and on the inner side will be referred to as a twelfth surface 52b and an intimate contact surface coaxial with the first seal portion 3 and on the inner side will be referred to as a thirteenth surface 52c.

Furthermore, the surface vertical to the circumferential direction out of wall surfaces defining the recess portion 51 will be referred to as a fourteenth surface 51a, an intimate contact surface in the normal direction of the first seal portion 3 and on the inner side will be referred to as a fifteenth surface 51b and an intimate contact surface coaxial with the first seal portion 3 and on the inner side will be referred to as a sixteenth surface 51c.

Incidentally, the twelfth surface 52b and the fifteenth surface 51b are located on the same plane. However, for the sake of explanation, these are given different names. Also, a surface that is a reference surface of the second cut end portion 5 will be referred to as a reference surface 53.

Then, under the condition that the seal ring 1 is mounted, the wall surfaces in the circumferential direction, i.e., the second surface 41b and the fifteenth surface 51b, the fifth surface 42b and the twelfth surface 52b, the third surface 41c and the sixteenth surface 51c and the sixth surface 42c and the thirteenth surface 52c are in intimate contact with each other.

On the other hand, the wall surfaces that are wall surfaces in the vertical direction to the circumferential direction which are facing with each other, i.e., the fourth surface 42a and the eleventh surface 52a, the first surface 41a and the fourteenth surface 51a and the reference surface 43 and the reference surface 53 are arranged so as to face each other interposing gaps, respectively.

Then, the third surface 41c and the sixteenth surface 51c that are cut surfaces extending in the circumferential direction of the convex portion 41 and the recess portion 51, respectively, out of the wall surfaces extending in the circumferential direction are in intimate contact with each other and corresponds to one apex angle of a cross-section pentagon of the ring body at the end portion of the intimate contact surface as apart of the cut surface. Namely, in the ring body, the one apex angle of the cross-sectional pentagon is brought into linear contact with the side wall surface 81a of the annular groove 81, thus forming the second seal portion 2.

Upon mounting of the special step cut, thus, since wall surfaces in the circumferential direction are brought into intimate contact with each other, it is possible to prevent the leakage of the sealed fluid.

Also, since the wall surfaces in the vertical direction to the circumferential direction are arranged so as to face each other interposing gaps, even if the seal ring 1 is shrunk due to difference in their linear expansion coefficients caused by difference in the material between the seal ring 1 and the housing 90, it is possible to absorb the amount of change corresponding to amounts of the provision of the gaps.

In the second seal portion 2 of the cut portion, the end portions of the third surface 41c and the sixteenth surface 51c that is in intimate contact with the third surface 41c out of the wall surfaces extending in the circumferential direction are brought into linear contact with each other, even if the gap between the first surface 41a and the fourteenth surface 51a is increased in accordance with the change in circumferential length of the ring body due to the ambient temperature change, there is no fear that a leakage path of the sealed fluid is formed. Since the sealing condition of the second seal portion 2 is kept unchanged, it is possible to keep preferable sealing performance even against the ambient temperature change.

Incidentally, in general, the seal ring 1 is made of resin and the housing 90 is made of metal. The amount of thermal expansion of the seal ring 1 is increased and the gaps are decreased at a high temperature due to the difference in the linear expansion coefficient. However, these gaps are designed so as not to be eliminated in principle.

As described above, in this embodiment, the seal ring 1 is mounted within the annular groove 81 so that the contact condition at the second seal portion 2 becomes linear. Accordingly, a lubricating film is likely to be formed at the seal portion.

Furthermore, in the cut portion S, since, in the second seal portion 2, the end portions of the third surface 41c and the sixteenth surface 51c that is in intimate contact with the third surface 41c out of the wall surfaces extending in the circumferential direction are brought into linear contact with the side wall surface 81a, even if the gap between the first surface 41a and the fourteenth surface 51a is increased in accordance with the change in a circumferential length of the ring body due to the ambient temperature change, the sealing condition of the second seal portion 2 is kept unchanged, and it is possible to keep preferable sealing performance even against the ambient temperature change. Therefore, there is no fear that the leakage path of the sealed fluid is formed as in the conventional case, and it becomes possible to reduce the leakage of the sealed fluid.

Also, it is possible to prevent foreign matters existing in the lubricating oil and worn powder that was generated due to the frictional wear from being entrained into the gap between the seal portion and the side wall surfaces of the annular groove as in the conventional area contact and, at the same time, it is possible to enhance discharging property of the foreign matters or the worn powder.

Also, even if the shaft is made of a soft material such as an aluminum alloy, the frictional wear hardly occurs, and thus it becomes possible to further enhance wear resistance property.

Also, even under a high PV condition, in which the conventional seal ring of the area contact type could not cope with due to sliding heat generation problem, it is possible, by utilizing the linear contact, to reduce the sliding heat generation. Accordingly, the invention is applied to the seal ring.

Incidentally, in the second seal portion 2, it is also preferable to perform beveling or chamfering (to provide an R-shape or a flat-shape portion). In this manner, it is possible to stabilize the contact condition with respect to the side wall surface 81a and to enhance the sealing property.

Figure 4:
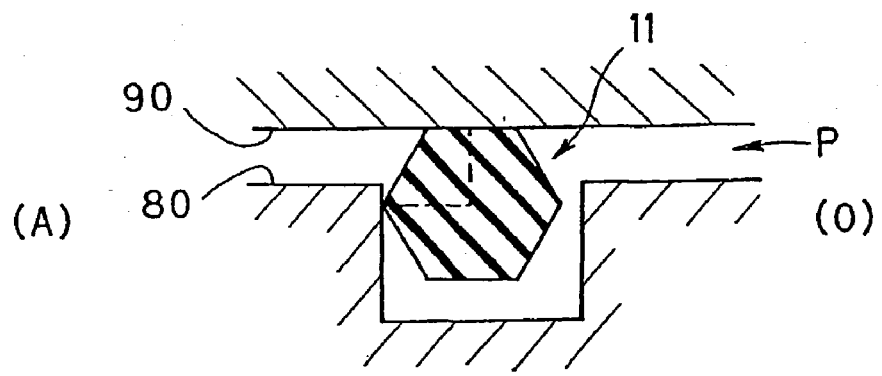
FIG. 4 is a schematic cross-sectional view showing a condition that the seal ring with a hexagonal cross-section is mounted.
Figure 5:
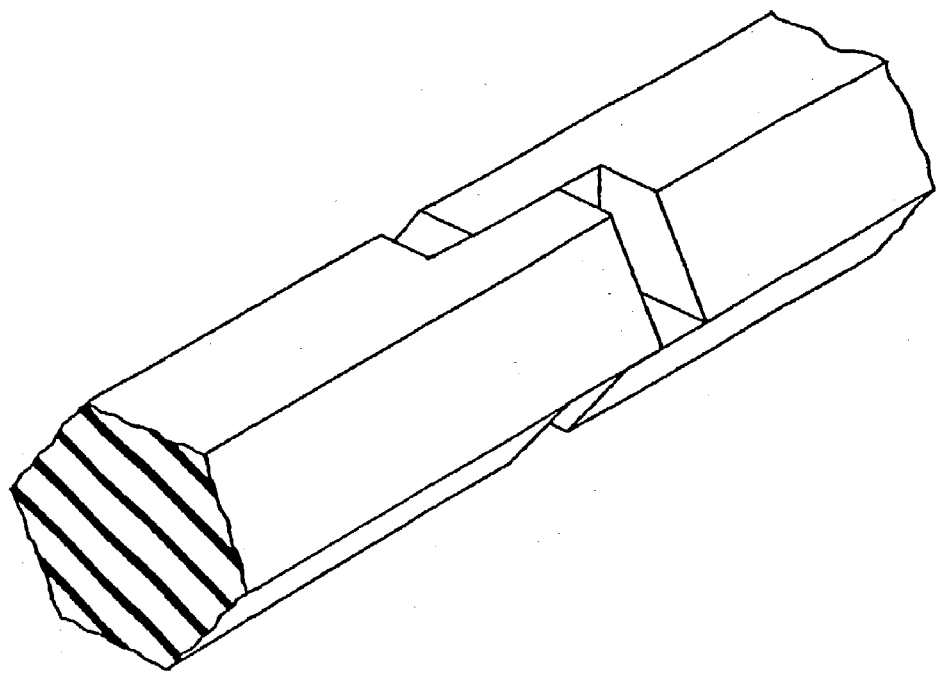
FIG. 5 is a schematic perspective view showing a cut portion of the seal ring with the hexagonal cross-section.
Figure 6:
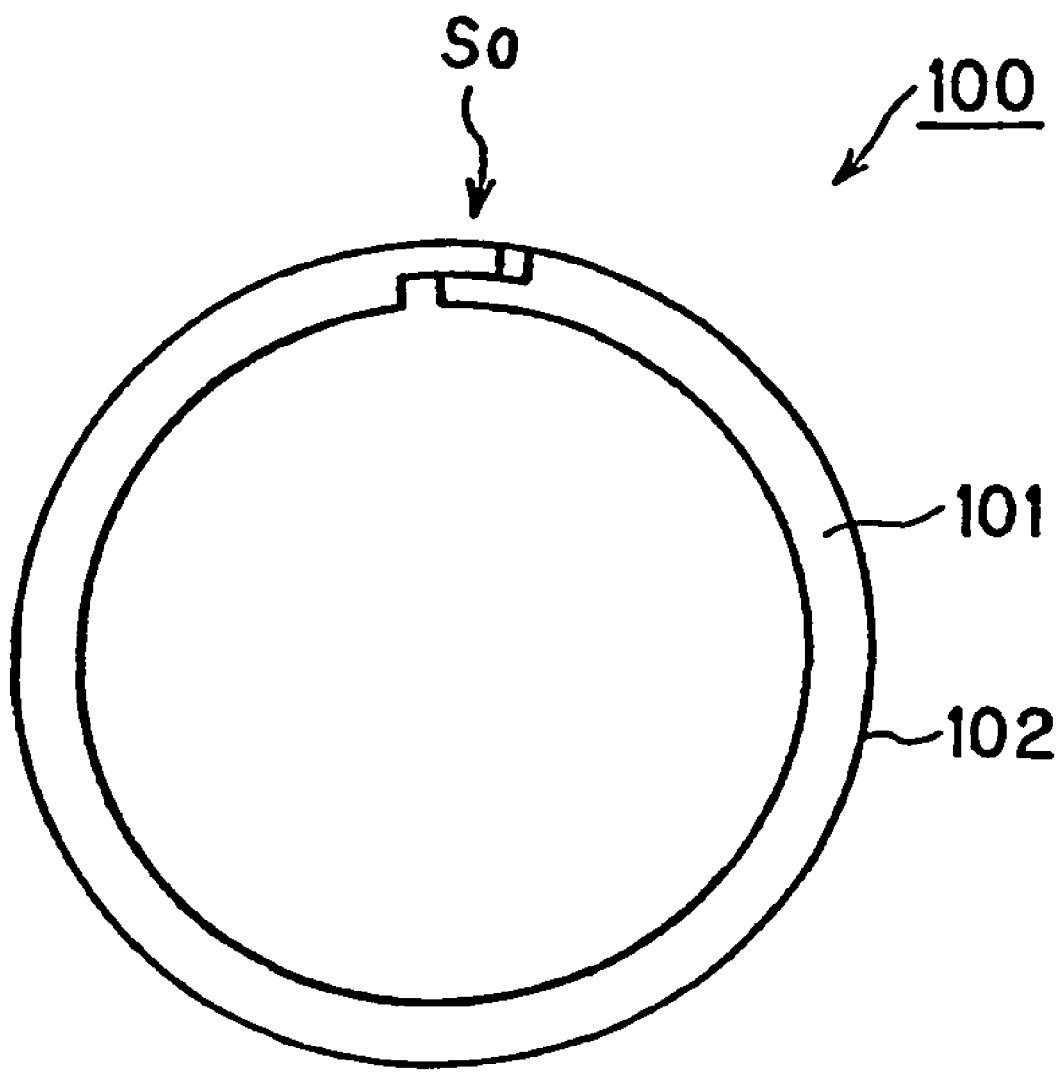
FIG. 6 is a schematic plan view of a conventional seal ring.
Figure 7:
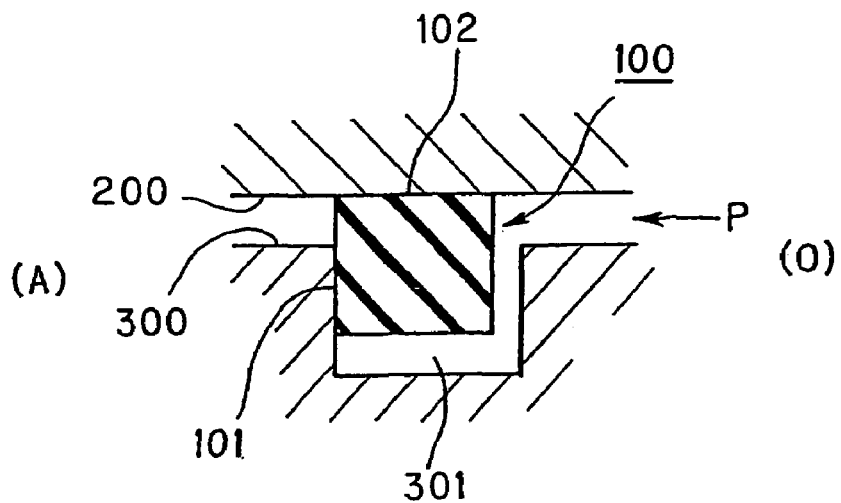
FIG. 7 is a schematic cross-sectional view showing a condition that the conventional seal ring is mounted.
Figure 8:
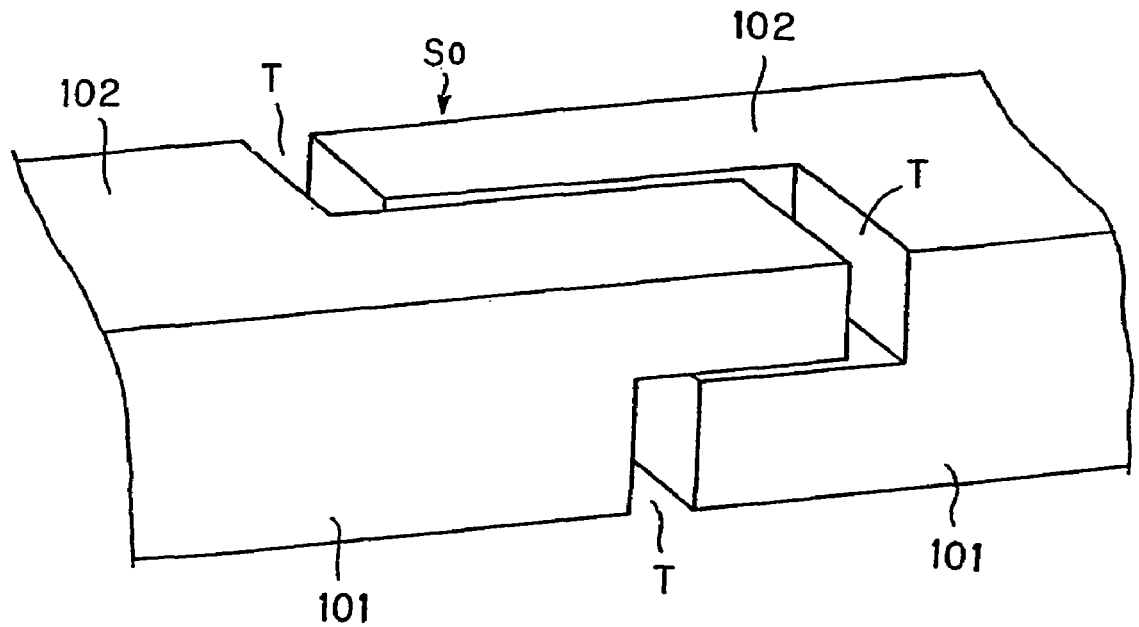
FIG. 8 is a perspective view showing a state of a cut portion of the conventional seal ring.
Figure 9:
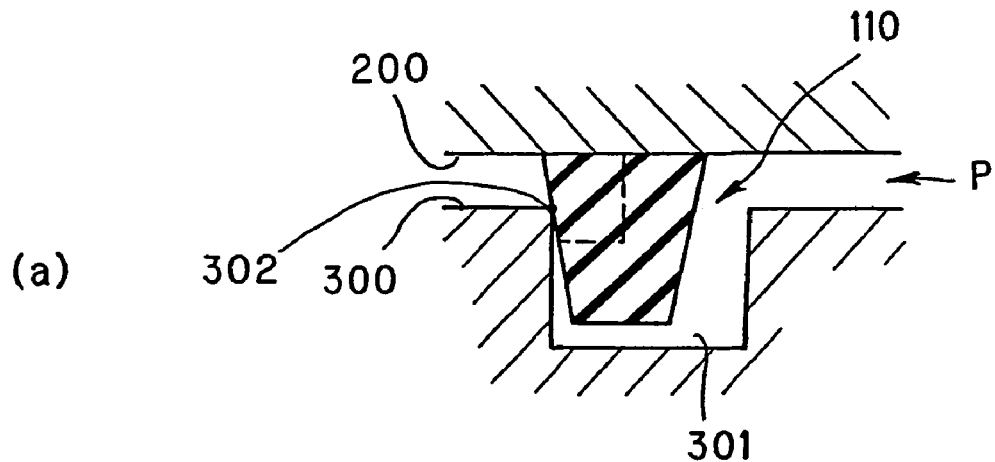
FIG. 9 is schematic views of the conventional seal ring, where
Figure 9:
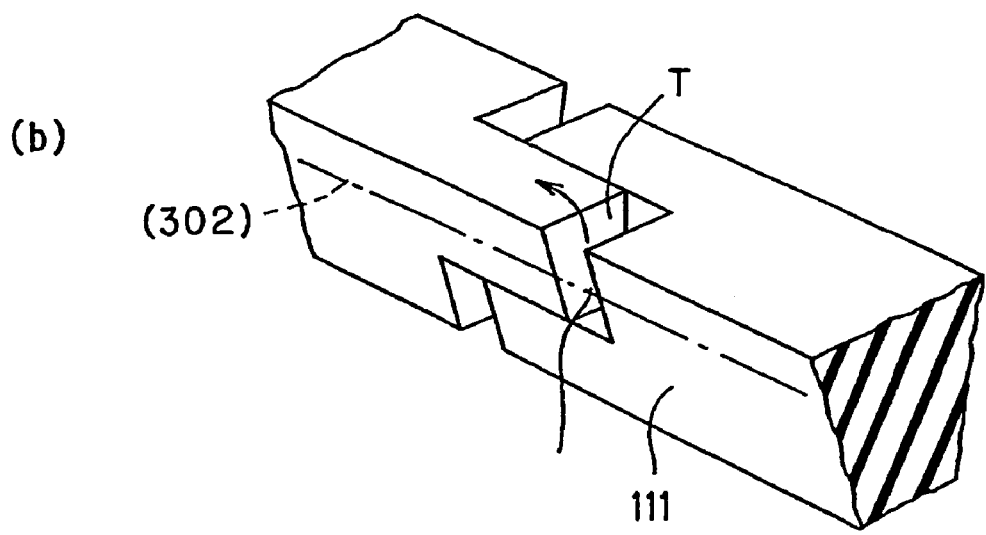

In this embodiment, the explanation has been given of the polygonal cross sectional shape. However, the shape is not limited thereto and, for example, the hexagonal shape may be used as shown in FIGS. 4 and 5. It is sufficient that the cross section has a shape contacting in a linear manner with the side wall surface 81a of the annular groove 81 for sealing and a part of the two cut end portions extending in the circumferential direction as described above is a part of the linear seal portion.

INDUSTRIAL APPLICABILITY

As described above, according to the present invention, the lubricating film can be easily formed on the seal surface, and the wear resistance property is enhanced. In addition, there is no leakage path of the sealed fluid even if the circumferential length of the ring body is changed, and it is possible to reduce the leakage of the sealed fluid from the cut portion since the seal condition of the second seal portion is unchanged.

Also, it is possible to prevent foreign matters existing in the lubricating oil and worn powder that was generated due to the frictional wear from being entrained into the gap between the seal portion and the side wall surfaces of the annular groove as in the conventional area contact type, and, at the same time, it is possible to enhance the discharging property of the foreign matters or the worn powder.

Even under the high PV condition, in which the conventional seal ring of the area contact type could not cope with due to the sliding heat generation problem, it is possible, by utilizing the linear contact, to reduce the sliding heat generation. Accordingly, the seal ring of the present invention can be used.

Also, the cross-sectional shape of the ring body is polygonal, whereby it is possible to easily and positively reduce the leakage of the sealed fluid from the cut portion.

What is claimed is:

1. A seal structure including a seal ring, said seal structure comprising
   a first seal portion for sealing one of two members assembled coaxially to be rotatable relative to each other,
   a second seal portion for sealing a side surface of an annular groove of the other member by coming into linear contact therewith for sealing an annular gap between said two members,
   a cut portion provided at one position in a circumferential direction of a ring body, a first arcuate convex portion projecting in the circumferential direction being provided at a first cut end portion, and a second stepped portion fitted into the first arcuate convex portion being provided at the second cut end portion; and
   a part of a cut surface, extending in the circumferential direction, out of said first arcuate convex portion and said second stepped portion corresponds to a part of said second seal portion,
   said annular gap between said two members being sealed by a pressure applied to said seal ring toward a non-sealed fluid side from a sealed fluid side.

2. The seal structure according to claim 1, wherein
   a cross-sectional shape of the ring body is polygonal; and
   said part of the cut portion corresponds to one of apex angles of said cross-sectional polygon in cross section and the one of the apex angles of the cross-sectional polygon becomes an annular shape and comes into linear contact with said side surface of said annular groove of the other member to perform sealing as said second seal portion.

3. The seal structure according to claim 1, wherein
   at said first cut end portion said first arcuate convex portion projects in the circumferential direction from a first reference surface thereof and is provided adjacent a first stepped portion which is recessed in the circumferential direction from said first reference surface, and
   at said second cut end portion said second stepped portion is recessed in the circumferential direction from a second reference surface thereof and is provided adjacent to a second arcuate portion which projects in the circumferential direction from said second reference surface to fit with said first stepped portion of said first cut end portion.

4. The seal structure according to claim 3, wherein
   a cross-sectional shape of the ring body is polygonal; and
   said part of the cut portion corresponds to one of apex angles of said cross-sectional polygon in cross section and the one of the apex angles of the cross-sectional polygon becomes an annular shape and comes into linear contact with said side surface of said annular groove of the other member to perform sealing as said second seal portion.

* * * * *